May 25, 1937.　　　　B. S. F. ELL　　　　2,081,803
OIL INSULATED CABLE
Filed Oct. 2, 1930　　　　2 Sheets-Sheet 1
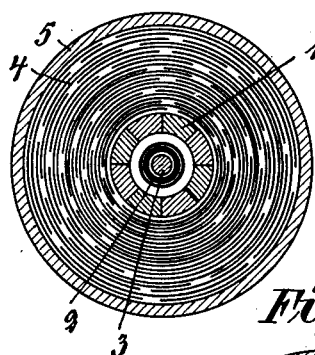
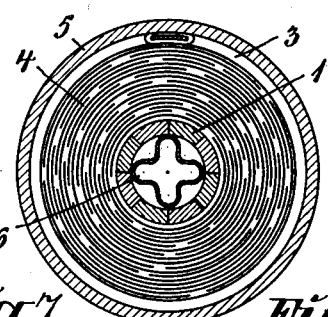
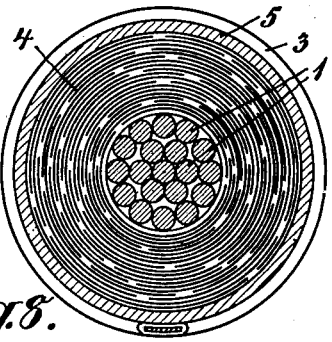
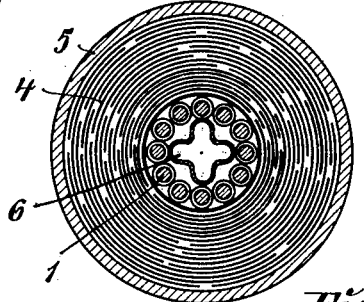
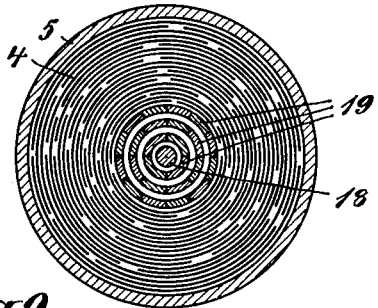
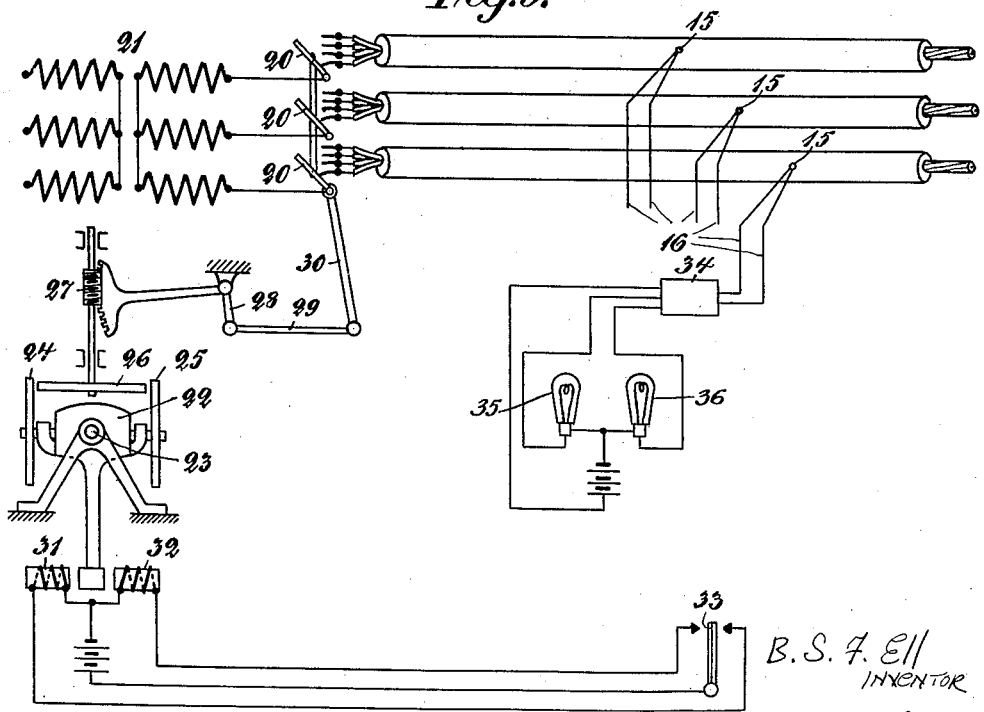
B. S. F. Ell
INVENTOR

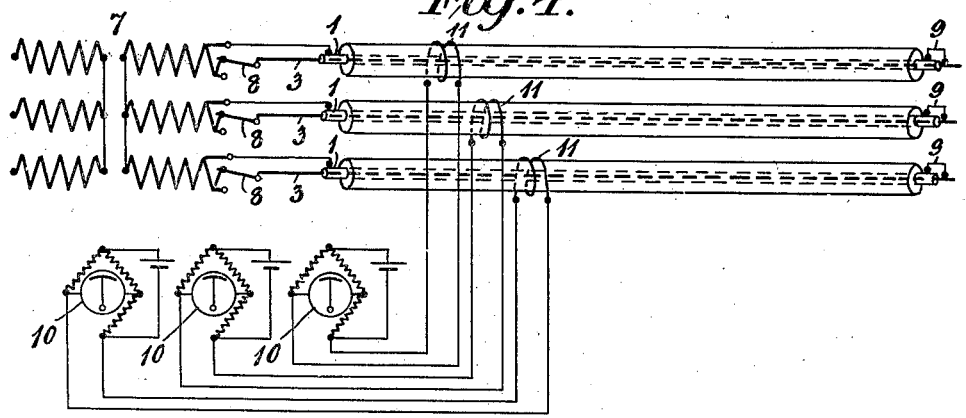
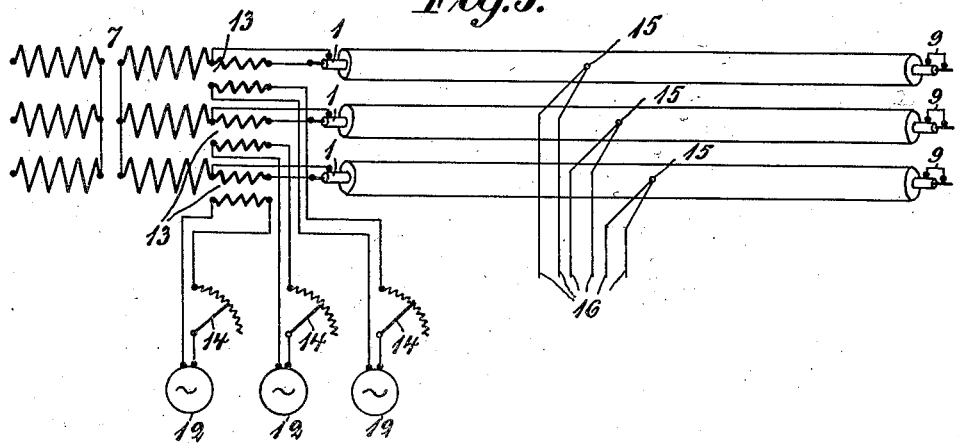
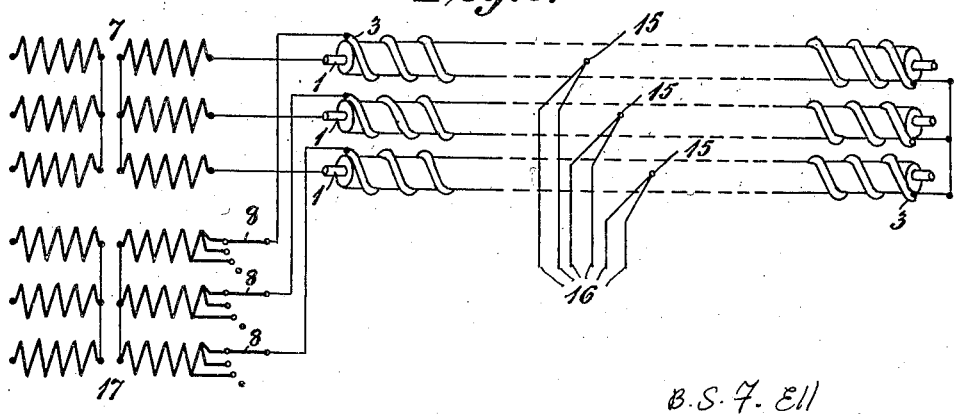

Patented May 25, 1937

2,081,803

UNITED STATES PATENT OFFICE 2,081,803

OIL INSULATED CABLE

Bernhard Sophus Faith Ell, Spanga, Sweden, assignor to Telefonaktiebolaget L. M. Ericsson, Stockholm, Sweden, a company of Sweden Application October 2, 1930, Serial No. 486,004
In Sweden October 16, 1929

12 Claims. (Cl. 171—97)

It is a well known fact that heavy current cables, particularly high tension cables, in operation are subjected to considerable temperature variations caused by fluctuations in the current load and, to a less degree, by changes in the temperature of the surroundings. Upon an increase in the temperature of the cable, the insulation expands and the pressure in the cable increases whereas, upon a fall in the temperature, the insulation contracts and the pressure is reduced. The movement of the oil insulation caused thereby results in the formation of ionization spaces or so-called vacuum cavities in the insulation whereby the insulation properties are weakened and the disruptive strength reduced. It has been previously proposed to eliminate said inconvenience by providing means adapted to check the longitudinal movements of the oil insulation in the cable. On the other hand, it has also been proposed to provide means adapted to facilitate the movement of the oil while overcoming the frictional resistance in the insulation. In the former case, there are provided expansion vessels in the cable proper which extend through the entire cable and allow radial expansion and contraction of the oil under the influence of a counter-pressure generated by the expansion vessel. In the latter case the interior of the cable has been adapted to communicate with a pressure vessel, the oil being allowed to move longitudinally through a hollow electrical conductor in the cable. All of said known dispositions of a pure mechanical nature render, however, the cable structure very complicated and hence very expensive.

The present invention has for its object to practically prevent any motion of the oil insulation in the cable and consists substantially therein that the cable is supplied with an amount of heat adjusted in relation to the load of the cable and the surrounding temperature in such a manner that the cable temperature is maintained substantially constant or is allowed to vary only within a temperature range, of which the limits are predetermined with regard to the detrimental influence of temperature variations upon the oil insulation. Preferably the heat is supplied in the form of electrical energy which is converted to heat in an electrical conductor suitably disposed in the cable or around the same. By such a temperature control the origin proper of the deterioration of the cable insulation is removed and a cable is obtained which is practically free from ionization and has a long longevity.

The invention will be more closely described with reference to the accompanying drawings showing different embodiments of the invention, Figures 1, 2 and 3 are cross sections of cables provided with a special conductor for the heating of the cable. Figures 4, 5 and 6 show different connections for the supply and regulation of the current to the heating or resistance conductors in the cable. Figures 7 and 8 are cross-sections of cables which are devoid of separate resistance conductors but in which a part of the useful energy transmitted through the cable is converted to heat energy. Figure 9 shows a switching arrangement for the regulation of the heat supply in cables of the latter kind.

In the cable shown in Figure 1 the main electrical conductor 1 is tubular and in known manner composed of a plurality of conductor strings. Inside said conductor there is disposed a resistance wire 3 having insulation 2 and being adapted to conduct the electrical current for heating the cable. The rest of the hollow conductor is filled with oil. The conductor 1 is surrounded by an insulation layer 4 which in turn is enclosed by a lead sheath 5.

In the embodiment shown in Figure 2 the resistance conductor is disposed between the insulation 4 and the lead sheath 5 and may be in the shape of a tapelike conductor 3 wound helically around the insulation. Figure 2 indicates also the manner of combining the invention with means for counteracting longitudinal movements of the oil insulation in the cable. In the shown example, the cable is for this purpose, in a manner known per se, provided with an expansion vessel disposed inside the hollow conductor 1 in the shape of a tubular plate body of such a cross sectional shape that it affords a certain radial elasticity so that said body, upon an increase in temperature and a corresponding increase in the oil pressure, may contract and allow the expansion of the oil whereas said body, upon a fall in temperature, may expand on account of its own elasticity. The expansion vessel thus exerts continuously an elastic pressure on the oil and counteracts thereby the formation of vacuum cavities. It is then assumed that the interspace between the expansion vessel 6 and the hollow conductor 1 is filled with oil. In an arrangement according to Figure 2, the supply of heat through the resistance wire 3 will consequently cooperate with the expansion vessel 6 for the same purpose, which operation affords the advantage that the cable temperature may be allowed to vary within a wider range of temperature without detrimentally affecting the oil insulation.

In the embodiment shown in Figure 3 the resistance wire 3 is disposed outside the lead sheath 5. The main conductor 1 is in this case composed of a plurality of bare wires.

Figure 4 shows a switching arrangement for the regulation of the temperature of the cable according to Figure 1 in a three-phase system. The conductor 1 in the different cables are connected to the secondary side of a transformer 7, of which the secondary coils are provided with a few additional turns. By means of switches 8 an adjustable current of comparatively low tension may be tapped off from said turns to the resistance wire 3. At the far ends of the cables the resistance wires 3 are connected to the conductor 1 as indicated at the numeral 9. The figure shows also means for controlling or indicating the cable temperature which means consist of galvanometers 10 and resistance elements 11 connected into Wheatstone bridges. Said element may consist of wires wound around the cables and made of a material of which the resistance varies with the temperature. The galvanometers 10 then serve to indicate the temperature in the appertaining cables.

Figure 5 shows another disposition in which the cable heating current is tapped off from separate alternating current sources 12 through the intermedium of transformers 13 the current supply being regulated by means of rheostats 14 included in the primary circuit. The temperature in the cables may be read off in arbitrary manner. In Figure 5 the cables may be provided with thermo-couples 15 connected through lines 16 to suitable instruments for indicating the temperature.

Figure 6 shows a switching arrangement for cables of the kind shown in Figure 3, the heating current being tapped off from a separate three phase current source 17 the secondary coils of which, in similarity with the arrangement in Figure 4, are provided with a few additional turns for tapping off a low tension current. The resistance conductors 3 are in this case disposed in star connection.

In the cable shown in Figure 7, the main conductor is constituted by a number of insulated conductors 1, of which an arbitrary number may be mutually parallel connected for the distribution of the main current over a bigger or smaller number of the conductors. The conductors 1 are disposed cylindrically so as to form a central hollow in the cable, filled with oil insulation. In said central hollow an expansion vessel 6 may also be disposed as shown in Figure 7 in similarity with the vessel disclosed in connection with Figure 2.

Figure 8 shows a cable where the main conductor is also divided into a plurality of parts insulated from each other. Said parts form in this embodiment a number of tubular conductors 19 coaxially disposed around a core wire 18 and provided with a suitable insulation.

Figure 9 discloses a method to regulate the temperature in the cable while using a part of the useful energy transmitted through the cable. Cables of the kind indicated in Figures 7 and 8 are then applied. The conductor parts insulated from each other may each be connected successively through switches 20 in parallel with one phase of an alternating current source 21 whereby the number of conductors may easily be varied in relation to the prevailing load so as to control the heat developed in the conductors to maintain the desired cable temperature. Figure 9 illustrates an automatic control device for regulating the temperature. For this purpose the switches 20 are adapted to be shifted automatically by means of a motor 22 the frame of which is pivoted on a shaft 23 and provided with two driving pulleys 24, 25, which, upon swinging the motor on its pivot 23, may be brought into engagement with a frictional disc 26 the motion of which may be transferred through a worm gear 27 and a lever system 28, 29, 30 to the switches 20. The motor normally takes up such a position that no motion is transferred to the switches 20. Upon the temperature in the cable exceeding or falling below respectively a certain predetermined value, the motor is tilted to the one or the other position through the intermedium of two electromagnets 31, 32 which are included in the circuit of a thermostat 33 disposed in thermical communication with the cable in such a manner that the circuit for the one electromagnet is closed at the lower temperature limit and the circuit for the other electromagnet is closed at the upper temperature limit in the cable. To indicate the cable temperature also optical means may be disposed under the control of a thermostat 34 which, by way of example, holds a green lamp 35 in circuit so long as the temperature in the cable falls within the allowed limits and which connects a red lamp 36 into circuit as soon as said temperature exceeds or falls below respectively said limits. The thermostat 34 may be directly or indirectly actuated by the cable temperature. On the drawings, the thermostat is indirectly actuated through the intermedium of a thermocouple disposed in thermical communication with the cable, the current from said couple passing a heating winding disposed on the thermostat.

I claim:—

1. A method for preventing movements of the oil, in oil insulated heavy current cables consisting in supplying heat to the cable and varying the supply of heat in relation to the current load of the cable and the surrounding temperature so as to keep the temperature in the cable substantially constant.

2. A method for preventing movements of the oil in oil insulated heavy current cables consisting in supplying electrical heating current to the cable and varying the supply of heating current in relation to the load of the cable and the surrounding temperature so as to keep the temperature in the cable substantially constant.

3. A method for preventing movements of the oil in oil insulated heavy current cables consisting in sending an electrical current through conductors in the cable and controlling said current in relation to the load of the cable and the surrounding temperature, so as to keep the temperature in the cable substantially constant.

4. A method for preventing movements of the oil in oil insulated heavy current cables consisting in supplying heat to the core of the cable by sending a heating current through a central conductor of the cable and varying the strength of said current in relation to the load of the cable and the surrounding temperature so as to keep the temperature in the cable substantially constant.

5. A method for preventing movements of the oil in oil insulated heavy current cables consisting in passing a heating current through an insulated conductor disposed between the central conductors and the lead sheath of the cable, and controlling said current in relation to the load of the cable and the surrounding temperature so as to keep the temperature in the cable substantially constant.

6. A method for preventing movements of the oil in oil insulated heavy current cables consisting in varying the total current carrying sectional area of the conductors of the cable in relation to the load of the cable so as to keep the temperature in the cable substantially constant.

7. A method as claimed in claim 6 in which the load current is passed through a number of parallel connected, mutually insulated conductors and in which the temperature in the cable is kept substantially constant by varying the number of parallel connected conductors.

8. In combination with an insulated electric cable and means for causing a power current to flow therein, means for controlling the heating of said cable independently of said power current comprising means for supplying an auxiliary heating current to said cable in amounts sufficient to minimize temperature variations in the insulation of said cable.

9. In combination with an insulated electric cable and means for causing a power current to flow therein, means for controlling the heating of said cable independently of said power current comprising means for superimposing an auxiliary heating current on said power current.

10. Apparatus for improving thermal conditions under the light load operating cycle of electric cables, comprising an electric conductor split into sections, and means for varying the current distribution between the sections so as to maintain thermal losses approaching full load conditions.

11. A temperature control system comprising an oil insulated heavy current cable including a plurality of parallel insulated conductors, a source of current, switching means controlling the connections between the source of current and the respective conductors, a driving device for actuating the switching means to vary the number of conductors connected with the source of current, a contact device responsive to temperature variations in the cable, and shifting means including circuits controlled by the contact device for reversing the operation of the driving device at certain temperatures in the cable to vary the number of conductors connected with the source of current to maintain the temperature of the cable within predetermined limits.

12. A temperature control system comprising an oil insulated heavy current cable including a plurality of parallel insulated conductors, a source of current, switching means controlling the connections between the source of current and the respective conductors, and means responsive to changes of temperature in the cable for actuating the switching means to vary the number of conductors connected with the source of current to maintain the temperature of the cable within predetermined limits.

BERNHARD SOPHUS FAITH ELL.